United States Patent
Wang et al.

(10) Patent No.: US 11,570,709 B2
(45) Date of Patent: Jan. 31, 2023

(54) BLE AND/OR WIFI COMPLIANT AND BLOCKER-RESILIENT WAKE-UP RECEIVER AND METHOD

(71) Applicant: The Regents of the University of California, Oakland, CA (US)

(72) Inventors: Po-Han Wang, San Diego, CA (US); Patrick Mercier, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 294 days.

(21) Appl. No.: 16/742,476

(22) Filed: Jan. 14, 2020

(65) Prior Publication Data

US 2020/0229088 A1 Jul. 16, 2020

Related U.S. Application Data

(60) Provisional application No. 62/791,978, filed on Jan. 14, 2019.

(51) Int. Cl.
| | |
|---|---|
| *H04W 52/02* | (2009.01) |
| *H04W 4/80* | (2018.01) |
| *H04W 40/12* | (2009.01) |
| *H04W 28/02* | (2009.01) |

(52) U.S. Cl.
CPC ......... *H04W 52/0222* (2013.01); *H04W 4/80* (2018.02); *H04W 28/0263* (2013.01); *H04W 40/12* (2013.01); *H04W 52/0225* (2013.01)

(58) Field of Classification Search
CPC ............... H04W 52/0222; H04W 4/80; H04W 28/0263; H04W 40/12; H04W 52/0225; Y02D 30/70
See application file for complete search history.

(56) References Cited

U.S. PATENT DOCUMENTS

| | | | | |
|---|---|---|---|---|
| 10,804,946 | B2 * | 10/2020 | Wang | H04B 1/1615 |
| 10,877,439 | B2 * | 12/2020 | Mercier | H03M 1/46 |
| 10,897,240 | B2 * | 1/2021 | Wang | H03K 17/687 |
| 2005/0186935 | A1 * | 8/2005 | Kawama | H04B 1/30 |
| | | | | 455/334 |

(Continued)

FOREIGN PATENT DOCUMENTS

| | | | | |
|---|---|---|---|---|
| WO | WO-0117122 A1 * | 3/2001 | | H03D 3/008 |
| WO | WO-2019140424 A1 * | 7/2019 | | H03K 17/0812 |
| WO | WO-2020081423 A1 * | 4/2020 | | G01K 7/00 |

OTHER PUBLICATIONS

N. E. Roberts et al., "A 236nW-56.5dBm-sensitivity bluetooth low-energy wakeup receiver with energy harvesting in 65nm CMOS," ISSCC 2016.

(Continued)

*Primary Examiner* — Mounir Moutaouakil
(74) *Attorney, Agent, or Firm* — Greer, Burns & Crain, Ltd.; Steven P. Fallon

(57) ABSTRACT

A low-power wake-up receiver includes a mixer-based two-stage heterodyne architecture that provides multi-stage channel filtering, including a combination of circuits and a digital signal processor that process energy in a plurality of advertising channels to detect a four-dimensional wake-up signature via frequency-hopping among the plurality of advertising channels. One receiver is a BLE/Wi-Fi dual-mode wake-up receiver.

16 Claims, 16 Drawing Sheets

(56) References Cited

U.S. PATENT DOCUMENTS

2007/0099582 A1* 5/2007 Chen .................... H04B 1/0071
455/76
2009/0209221 A1* 8/2009 Jeong .................. H03G 3/3068
455/234.1

OTHER PUBLICATIONS

M. Ding et al., "A 2.4GHz BLE-compliant fully-integrated wakeup receiver for latency-critical IoT applications using a 2-dimensional wakeup pattern in 90nm CMOS," RFIC 2017.

M. R. Abdelhamid et al., "A-80dBm BLE-compliant, FSK wake-up receiver with system and within-bit duty-cycling for scalable power and latency," CICC 2018.

A. Alghaihab et al., "A 150 µW-57.5 dBm-sensitivity Bluetooth Low-Energy back-channel receiver with LO frequency hopping," RFIC 2018.

* cited by examiner

Voting of correct packet length at all 3 adv. channels
Ex 1: avoiding missed detections caused by blocker Ex 2: avoiding false alarms caused by blocker

BLE AND/OR WIFI COMPLIANT AND BLOCKER-RESILIENT WAKE-UP RECEIVER AND METHOD

PRIORITY CLAIM AND REFERENCE TO RELATED APPLICATION

The application claims priority under 35 U.S.C. § 119 and from all applicable statutes and treaties from prior provisional application Ser. No. 62/791,978 which was filed Jan. 14, 2019.

FIELD

A field of the invention is low-power wake-up receivers. Embodiments of the invention provide Bluetooth-Low-Energy-standard-(BLE) and/or WiFi compliant, low-power, and blocker-resilient wake-up receivers and methods that can extend battery lifetime for system with Bluetooth and WiFi radios without compromising latency and sensitivity.

BACKGROUND

Low-power wide-area networks are a key component of future smart networks that contain many devices and include infrastructure that will be connected via an Internet of Things (IoT). For such networks to function, a large number of connected devices in the network (e.g., smart meters, environmental sensors, and threat monitors) must operate for years from small batteries or energy harvesters, e.g., solar cells, and communicate over long distances that defined the network. This necessitates inclusion of ultralow power radios with high sensitivity—two parameters that embody conflicting goals.

Wake-up receivers (WuRXs) offer an attractive low-power means to synchronize low-average-throughput wireless devices without requiring energy-expensive periodic synchronization routines between primary radios. To achieve low-power operation, many prior WuRXs utilize custom on-off keying (OOK) or frequency shift keying (FSK) modulation schemes that are not compliant with any standards, while also forgoing important capabilities present in more powerful radios, such as the ability operate in the presence of potentially large interferers or dynamically switch between multiple channels—both of which are very important when operating in congested bands.

Bluetooth Low Energy (BLE) is one of the most popular standards for low-power IoT devices. Prior work has endeavored to develop BLE-compliant WuRXs that achieve low-power operation through means of back-channel (BC) communication—signals that are generated by a standard-compliant BLE TX, yet encode information in a modality that can be demodulated by low-power means. A popular technique is direct energy detection as described in 1) N. E. Roberts et al., "A 236 nW −56.5 dBm-sensitivity bluetooth low-energy wakeup receiver with energy harvesting in 65 nm CMOS," *ISSCC* 2016; and 2) M. Ding et al., "A 2.4 GHz BLE-compliant fully-integrated wakeup receiver for latency-critical IoT applications using a 2-dimensional wakeup pattern in 90 nm CMOS," *RFIC* 2017. Unfortunately, these wideband energy detectors directly demodulate interferers with no channel selectivity, and introduce significant demodulated RF noise, limiting sensitivity to −56.5 dBm at 236 nW and −58 dBm at 164 µW, respectively. To impart channel selectivity, a mixer-first architecture is described in 3) M. R. Abdelhamid et al., "A −80 dBm BLE-compliant, FSK wake-up receiver with system and within-bit duty-cycling for scalable power and latency," *CICC* 2018. This architecture is reported to achieve a sensitivity of −80 dBm at 230 µW, though this does not include the power of a PLL or FLL to stabilize the free-running single-channel VCO. To facilitate stabilized multi-channel operation, a 120 µW crystal-stabilized FLL-based LO generator was described in 4) A. Alghaihab et al., "A 150 µW −57.5 dBm-sensitivity Bluetooth Low-Energy back-channel receiver with LO frequency hopping," *RFIC* 2018. That receiver included frequency hopping support, for a total WuRX power of 150 µW. While selective, the design achieved a sensitivity of only −57.5 dBm.

SUMMARY OF THE INVENTION

A preferred low-power wake-up receiver includes a mixer-based two-stage heterodyne architecture that provides multi-stage channel filtering, including a combination of circuits and a digital signal processor that process energy in a plurality of advertising channels to detect a four-dimensional wake-up signature via frequency-hopping among the plurality of advertising channels. The plurality of advertising channels preferably is three advertising channels and the combination of circuits and the digital signal processor implement majority voting among the three advertising channels to produces a wake-up signal when two of the channels include the four-dimensional wake-up signature.

DESCRIPTION OF THE PREFERRED EMBODIMENTS

Preferred embodiments provide an interferer-resilient BLE-compliant wake-up receiver (WuRX) that utilizes a 4-dimensional wake-up signature. A wake-up method of the invention transmits a 4-dimensional wake-up signature from a transmitter, and the signature includes dimensions that are 1) the length of each advertisement packet; 2) amplitude of the received packets; 3) a time interval between packets; and 4) a sequence of selected frequencies (e.g., Ch. 37, 38, then 39 is one sequence, while Ch. 38, 37, 39 is another sequence, and so on). In preferred embodiments, circuitry checks length of packets and amplitude of packets at in intermediate frequency and a baseband digital signal processor checks time interval and frequency sequence. An example prototype WuRX of the invention achieves the best sensitivity (−85 dBm) and blocker rejection (−60 dB) compared to known prior BLE-compatible WuRXs.

A preferred embodiment includes a single-die 3-channel FBAR (Film Bulk Acoustic Resonator) filter that directly filters BLE advertising channels. More generally any SAW or BAW filter that can provide filtering at the wireless band of interest (e.g. BLE or WiFi) for the advertising channels can be used. SAW filters are typically used for lower frequencies (up to 2.7 GHz) and BAW filters are typically used at higher frequencies (2.7 GHz-6 GHz.) a frequency-hopping time-counting majority-voting procedure providing low-cost BLE compliant energy-detection-based demodulation over four distinct dimensions; mixing each advertisement channel down to low or intermediate frequency prior to energy-detection via a two-stage heterodyne structure for further channel filtering and adjacent channel rejection; and implementing a 3-channel LO (local oscillator) generator via an ultra-low-power crystal-stabilized integer-N PLL with frequency tripler.

Preferred embodiments leverage FBAR-based filtering and an elegant frequency plan compatible with BLE advertisement channels, yet while also supporting simple and low-power frequency synthesis via integer-N arithmetic. The invention advances the state-of-the art. Compared to [M. R. Abdelhamid et al., "A −80 dBm BLE-compliant, FSK wake-up receiver with system and within-bit duty cycling for scalable power and latency," IEEE CICC, pp. 1-4, April 2018], which did not report any blocker rejection numbers, receivers in accordance with the present invention achieve excellent blocker tolerance and can, for example, provide up to 5 dB or more better sensitivity and FoM. Compared to [A. Alghaihab et al., "A 150 µW −57.5 dBm-sensitivity Bluetooth Low-Energy backchannel receiver with LO frequency hopping," IEEE RFIC, pp. 324-327, June 2018], which does have block rejection capabilities, example receivers of the invention achieved 27.5 dB better sensitivity and 25.8-to-34.5 dB better FoM.

Example embodiments are now described with respect to the drawings. Artisans will appreciate the scope of the invention from the example embodiments.

Figure 1A:
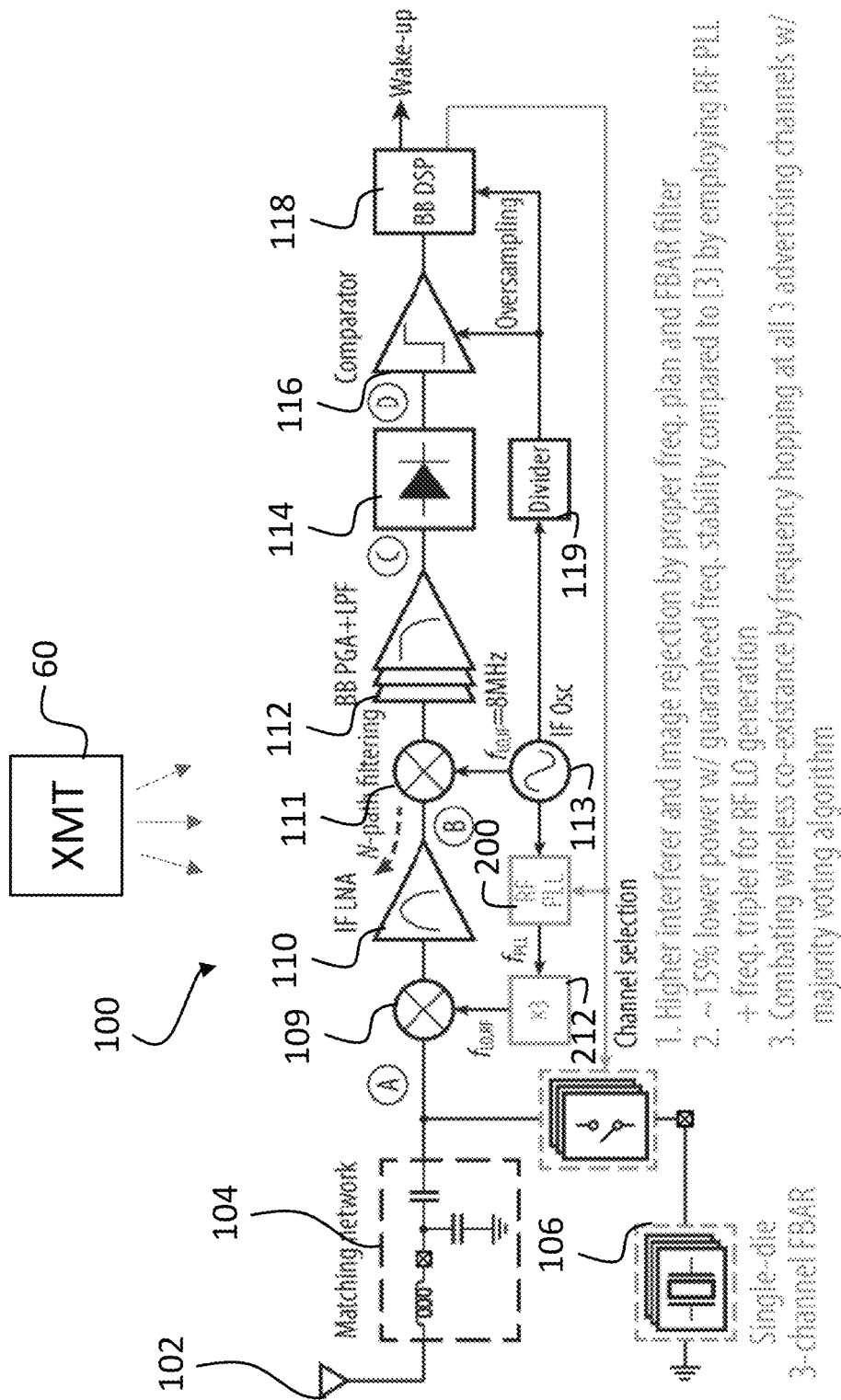
FIG. 1A shows a preferred embodiment interferer-resilient BLE-compliant wake-up receiver (WuRX) that utilizes a 4-dimensional wake-up signature.

FIG. 1A illustrates a preferred WuRX 100 that is BLE compliant. An antenna 102 receives RF signals. A matching network 104 provides impedance matching for the antenna 102. After 9 dB of passive voltage gain, RF signals are filtered by the 3-channel single-die FBAR filter 106, a single channel of which is selected one at a time via an integrated SP3T switch 108.

Figure 1B:
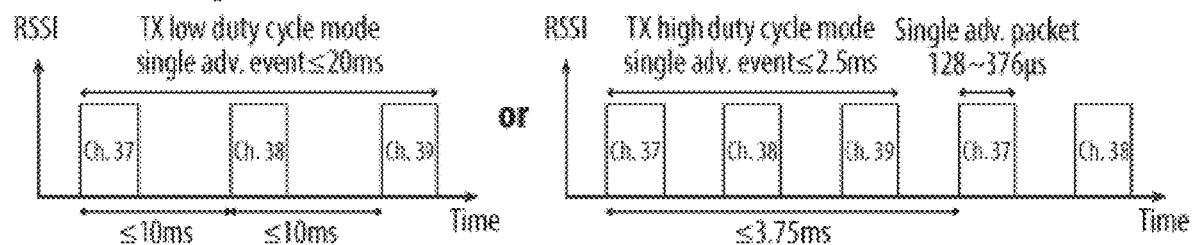
FIG. 1B FIG. 1B shows a preferred advertising channel specifications from the BLE protocol for the FIG. 1A WuRX.
Figure 1B:
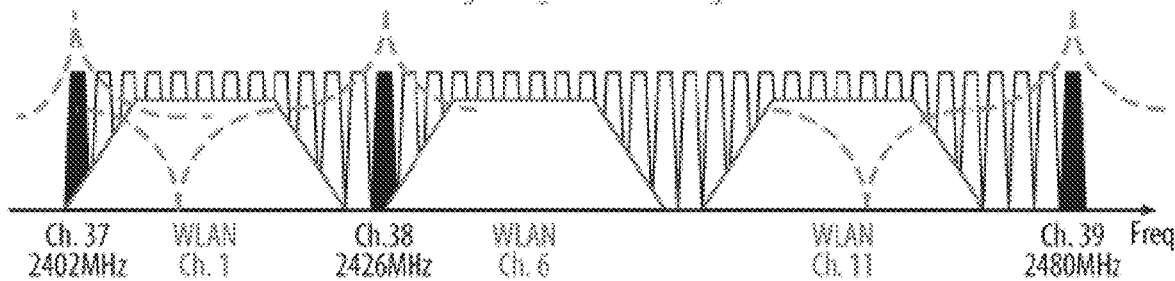

FIG. 1B shows the recommended advertising channel specifications from the BLE protocol, indicating that most BLE devices advertise at three distinct frequencies in the time sequence indicated. The preferred WuRX exploits this transmission event to encode a wake-up signature. Specifically, a 4-dimensional wake-up signature is preferred, where information is encoded in: 1) the length of each advertisement packet; 2) amplitude of the received packets; 3) a time interval between packets; and 4) a sequence of selected frequencies (e.g., Ch. 37, 38, then 39 is one sequence, while Ch. 38, 37, 39 is another sequence, and so on). A correct wake-up signal can be sent by a transmitter 60 that knows the wake up signature for the WuRX. In practice, each device having a WuRx of the invention can have a predetermined unique 4-dimensional signature, or can update its signature according to a plan or communications after being woken up according to a programmed signature.

Figure 1C:
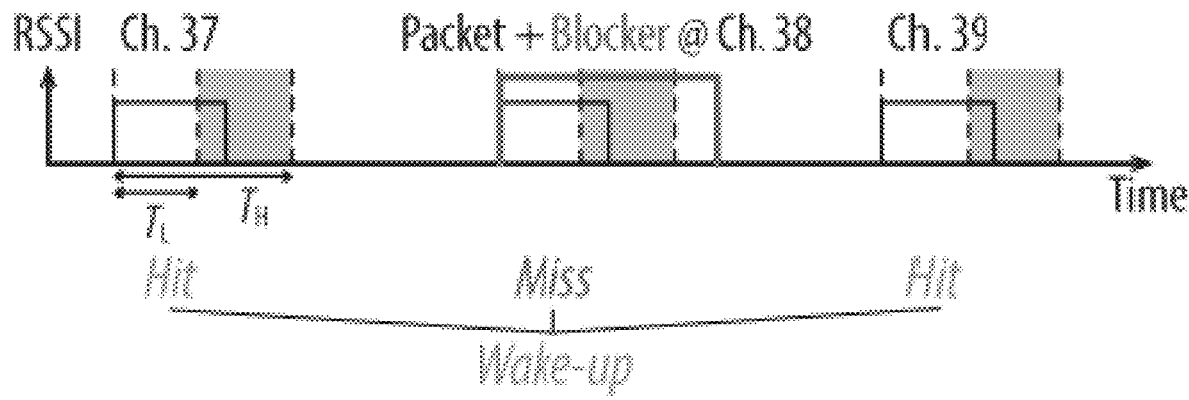
FIG. 1C FIG. 1C shows a preferred frequency hopping wake-up messaging scheme.
Figure 1C:
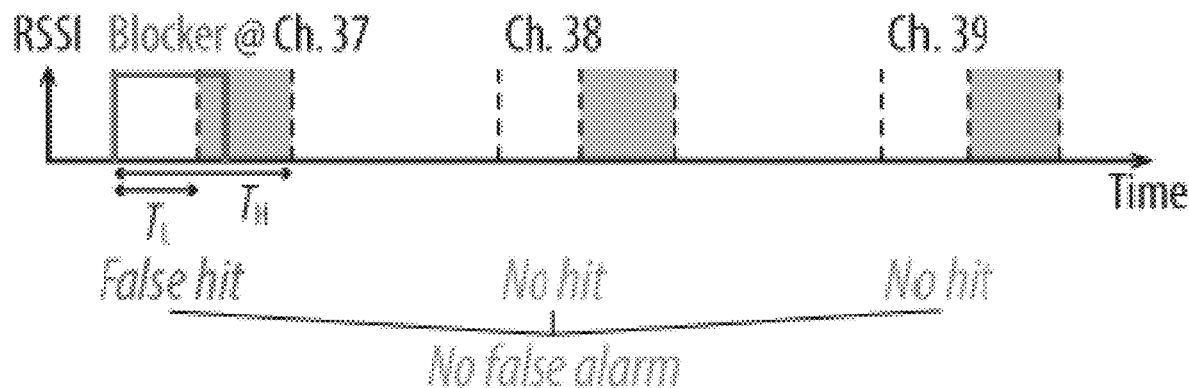

FIG. 1C shows a preferred frequency hopping sequence wake-up messaging. The WuRX performs a majority voting algorithm to determine if the correct wake-up signature is detected. In example 1 in FIG. 1C, if a blocker is present during the interval in time in which the WuRX is evaluating Ch. 38, and the magnitude or length of the blocker exceeds the expected amount from the advertisement packet, then the WuRX will infer that no correct advertisement packet was received at that time and frequency. However, if the advertisement packets at channels 37 and 39 were received properly, the WuRX still decides that a wake-up event has occurred through the majority voting algorithm.

Example 2 in FIG. 1C shows that if a blocker happens to occur when the WuRX is evaluating Ch. 37, and that blocker has the right amplitude and packet duration, the WuRX will consider that to be a successfully received advertisement packet, and subsequently look to the next channel in the sequence to look for additional advertisement packets. However, since this was kicked-off by an erroneous blocker, it is unlikely that advertisement packets of the correct timing and magnitude will be present at the other channels at precisely the right time, and thus no false alarm wake-up is triggered.

Figure 1D:
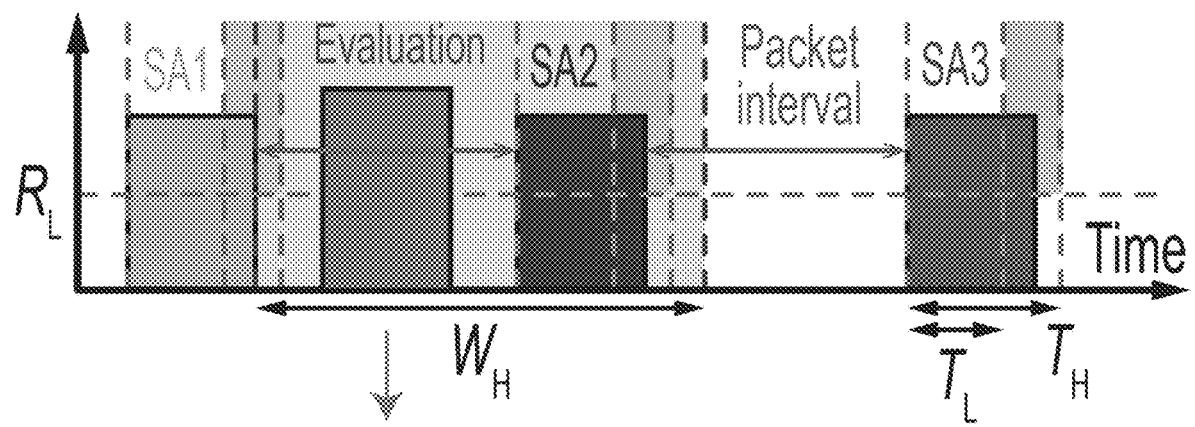
FIG. 1D shows that a blocker (any strong and unwanted signal that can block a desired signal) present at a correct frequency can be rejected in the FIG. 1A WuRX.

FIG. 1D shows that a blocker present at a correct frequency but outside of the time-window of evaluation will be ignored and will not trigger a wake-up event.

Figure 2A:
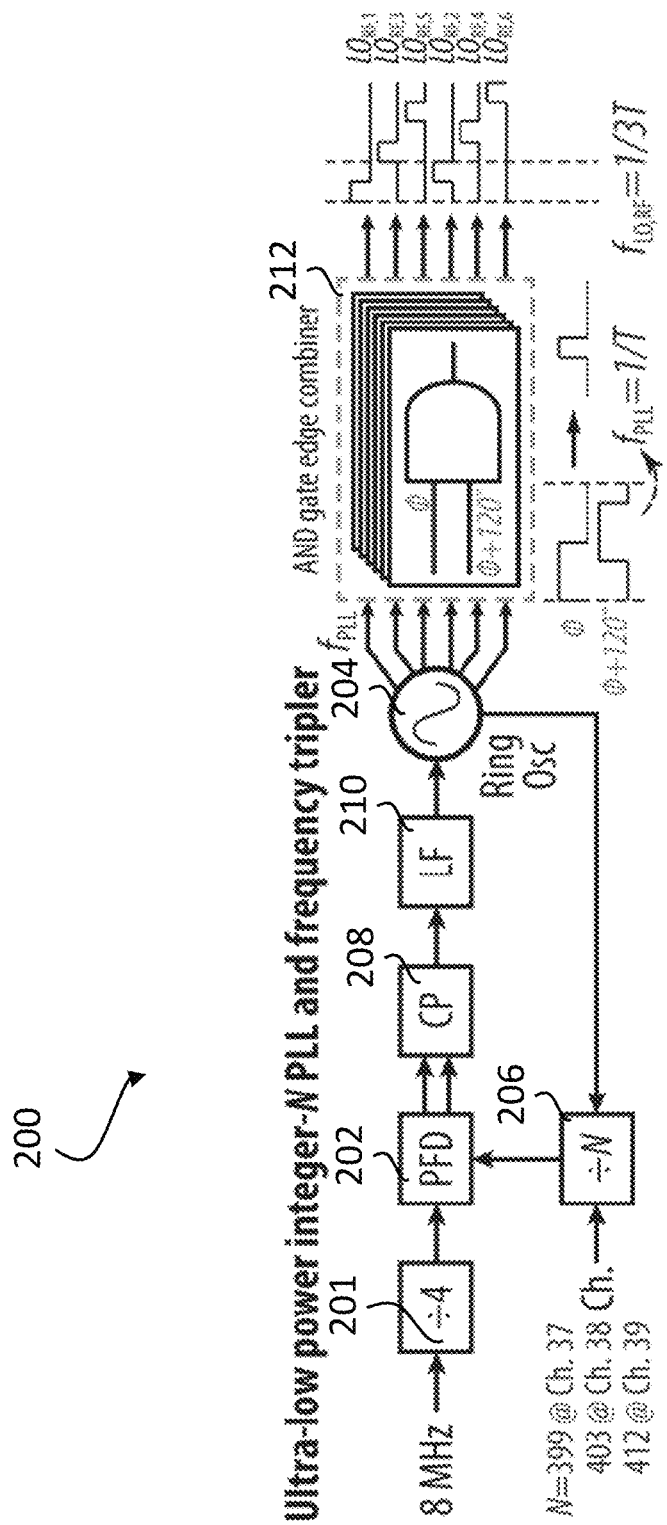
FIG. 2A shows a preferred embodiment inteter phase locked loop (PLL) for the FIG. 1A WuRX.
Figure 2B:
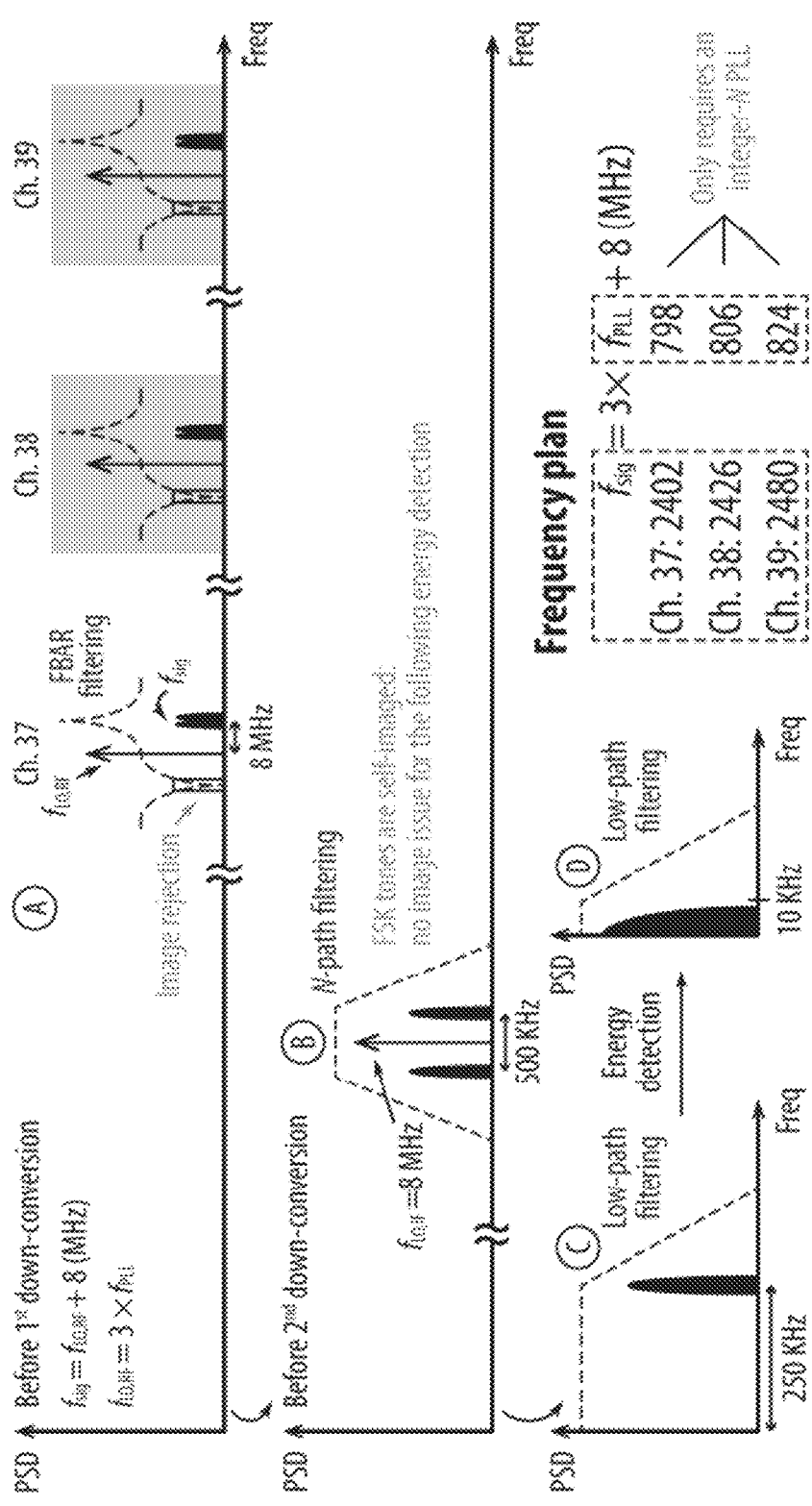
FIG. 2B shows a frequency plan for an RF local oscillator (LO) of the FIG. 1A WuRx that is stabilized by the FIG. 2A PLL.

FIG. 2A shows a preferred RF PLL 200 of FIG. 1A. As shown in FIG. 1A and the frequency plan of FIG. 2B, an RF local oscillator (LO) 111, which is stabilized by a PLL 200, is designed to be located 8 MHz lower than the channel, and is used to downconvert one of the 3 channels to an 8 MHz IF. The center frequency for the three BLE advertisement channels are at 2402, 2426, and 2480 MHz, and the LO to downconverter these to an 8 MHz IF are generated in a low-power manner via the integer-N PLL depicted in FIG. 2A. The PLL takes an 8 MHz crystal reference. A divider 200 divides this reference by 4, A phase frequency detector 202 compares the divided reference signal to the from ring oscillator 204 through a divider 206 that. Instead of operating at 2.4 GHz, which consumes significant power, the ring oscillator is designed to operate at 798, 806, or 824 MHz, and is stabilized to these specific frequencies via divider ratios of N={399, 403, 412} to save power. Integer division, rather than fractional division, is employed here via the carefully architected frequency plan, which saves power. The phase detector 202 produces an error signal that is proportional to the phase difference. In the preferred embodiment, the phase detector 202 is current based and a charge pump 208 generates a corresponding voltage to a loop filter 210 that extracts low frequency content of the phase error signal, which is fed to the VCO 204. The VCO 204 produces an output frequency proportional to the low frequency error signal, which is then divided by the divider 206. The closed-loop feedback permits the PLL to quickly lock on to a frequency.

The final LO frequency at 2402, 2426, and 2480 MHz are subsequently generated via an AND-based frequency-tripling edge combiner 212, enabled via the naturally-occurring multiple phases in the ring oscillator 204. As part of the tripler, the LO drives a 2-phase 6-switch passive mixer 109, the output of which passes through an inverter-based IF amplifier 110 (FIG. 1A). The IF signal is then, thanks to the careful frequency planning, easily mixed to baseband via an 8 MHz crystal reference 113 and an N-path filtering passive mixer 111. Fortunately, the 500 kHz-spaced FSK tones generated by the BLE standard are, for the purposes of energy detection, self-images of each other when centered around the 8 MHz IF LO, and thus a 3-stage low-pass filter 112 (BB PGA+LPF –Base Band Programmable Gain Amplifier and Low Pass Filter) (shown in detail in FIG. 3B) with 27-45 dB gain are used to condition the 250 kHz downconverted signal. Envelope detection is then performed by a cross-coupled self-mixing envelope detector (ED) 114 to provide a pseudo-differential BB signal and forgo the need of a precise voltage reference for the following 25× oversampled 2-stage dynamic comparator 116 (shown in detail in FIG. 3C), which utilizes capacitive trimming to set the comparison threshold.

An on-chip digital baseband and finite state machine (FSM) 118 is used to parse BB data to decide if a wake-up signature is detected. The BB DSP receives its clock from a frequency divider 119, which in the example FIG. 1A implementation divides the 8 MHZ clock to hundreds of KHz, e.g., 125 KHz). Two dimensions are used to detect the presence of an advertisement packet at a single frequency: the packet must meet a minimum power threshold defined by both a PGA in 112 and the comparator 114 threshold, and be within a pre-specified packet length tolerance between TL and TH, which are the lower and upper bond of the targeted packet length (a single BLE packet length can be between 128~376 μs with 1 μs steps). With majority-voting and with an on-chip digital BB, two additional dimensions are added to the WuRX: channel frequency, and the hopping sequence between channels. Conventional designs use only one channel to detect an advertising packet that is transmitted on all channels, Ch 37, 38, and 39 in BLE. In preferred embodiments of the invention, the advertising message is detected with a 4-dimensional on two or all 3 advertising channels under a defined routine. The WuRX has additional resilience because it detects a wake-up signal on multiple and preferably all advertising channels to ensure a BLE advertising event is distinguished from other signals. This approach increases detection accuracy, lowers false alarm rate, and enhances interference resiliency. The on-chip FSM 118 begins by detecting energy in Channel 37. If the correct single-channel signature is received, the FSM moves to Channel 38, and then Channel 39 according to desired timing, which is programmable. If Channel 38 has an overlapping Wi-Fi or BLE blocker whose packet is longer than desired, as illustrated in Ex. 1 in FIG. 1C, Channel 38 will miss detection, but if Channels 37 and 39 hit, the 4-dimensional wake-up signature is still detected. The 4D signature also helps prevent false-alarms—for example, if Channel 37 hits due to a blocker, yet Channels 38 and 39 do not, no false alarm is observed as illustrated in Ex. 2 in FIG. 2. There are over 38,000 possible signatures available to decode in this design.

Figure 3A:
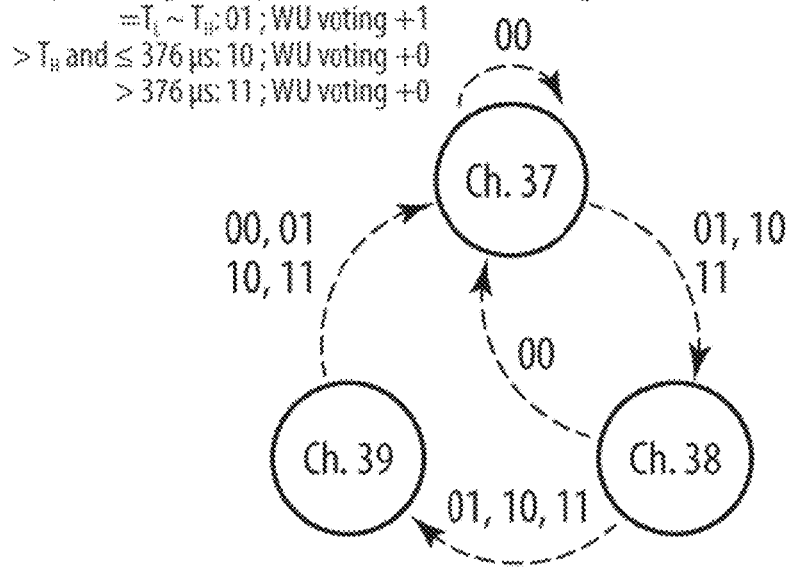
FIG. 3A is a state machine diagram for the digital signal processor of FIG. 1A that governs the sequencing behavior for channel selection during signature testing.
Figure 3B:
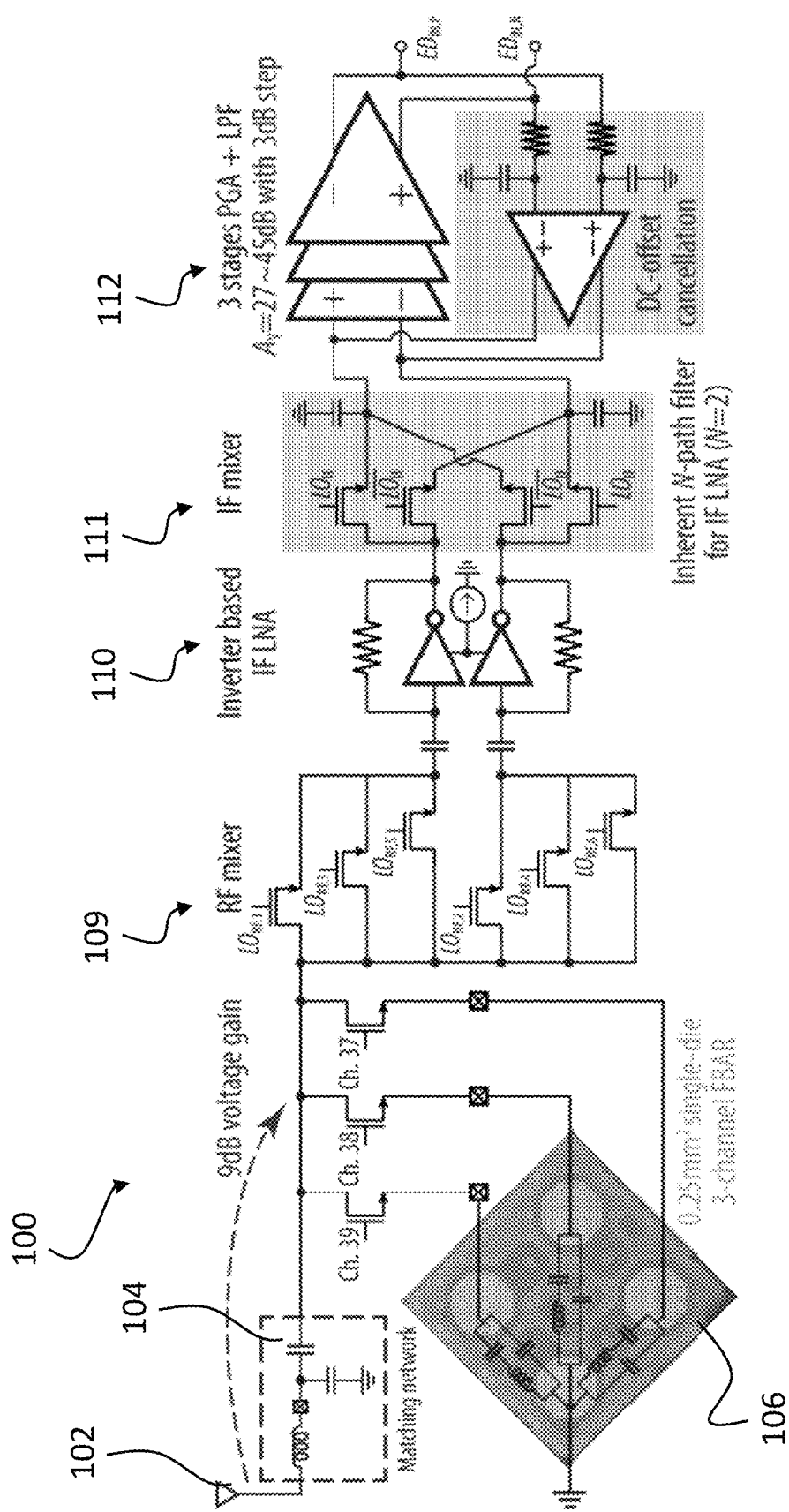
FIG. 3B is a schematic diagram of a preferred Base Band Programmable Gain Amplifier and Low Pass Filter of FIG. 1A with other FIG. 1A features that provide channel filtering operations.
Figure 3C:
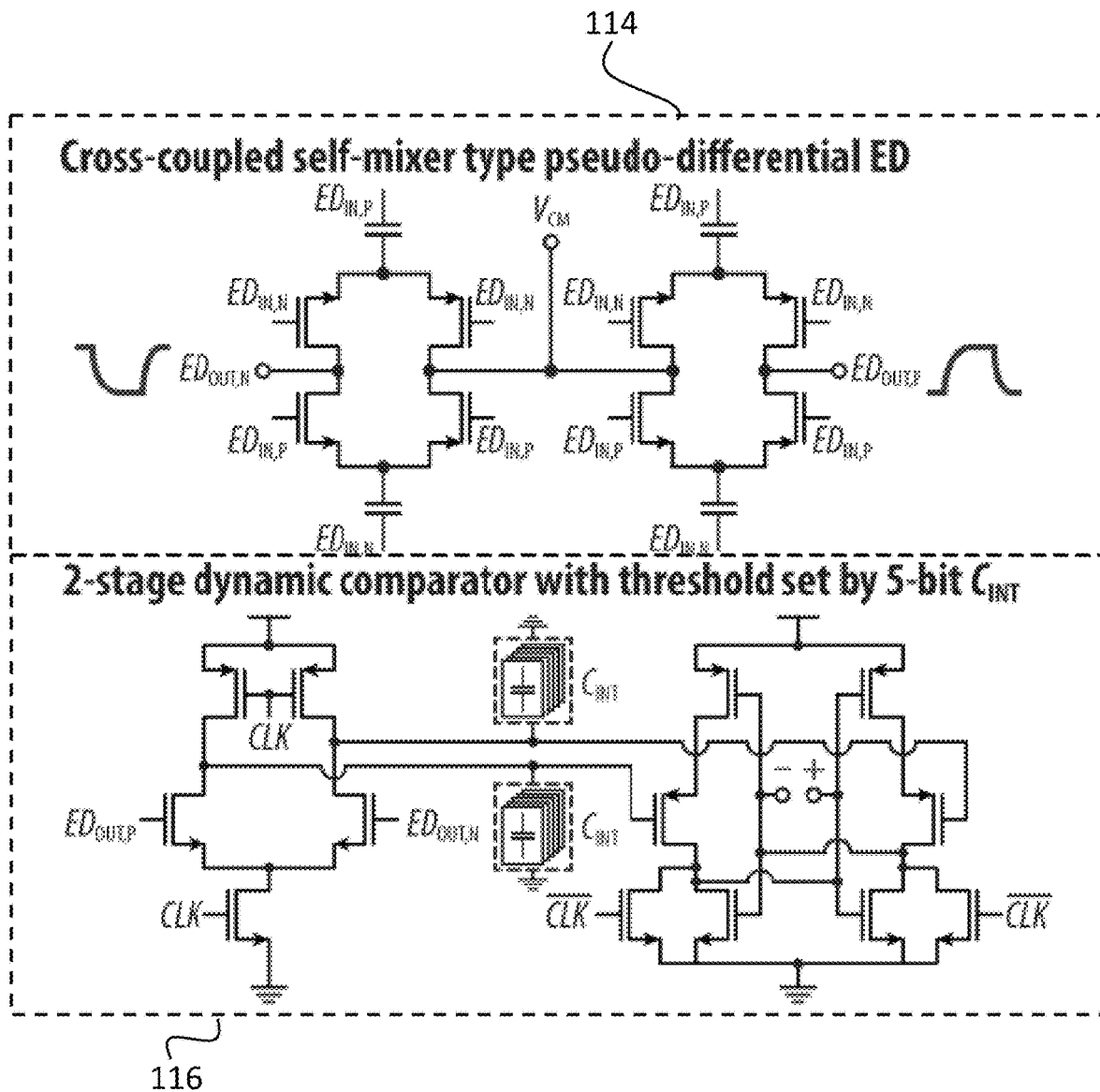
FIG. 3C is a schematic diagram of a preferred dynamic comparator of FIG. 1A.

The state machine diagram for the BB DSP 118 governing the sequencing behavior is shown in FIG. 3A. A prototype BLE-compatible WuRX of the invention was fabricated in 65 nm, and a single-die 3-channel FBAR is stacked and wirebonded on top. The schematic circuit for the prototype that was consistent with FIG. 1A is shown in FIGS. 3B and 3C. FIG. 3B is labelled with reference numerals from FIG. 1A.

In the prototype, the FBAR filters have 3 dB bandwidths of 9.7 MHz, temperature coefficients of 0.89 ppm/° C., and bondwire length variation can alter the center frequency by up to 200 kHz/100 μm. Testing showed, with the entire system operating together, the WuRX achieves a sensitivity of −85 dBm for a missed detection rate of $10^{-3}$ and a false-alarm rate less than once per half hour. The filtering characteristics of the FBAR and the heterodyne structure help a single channel achieve a signal-to-interference ratio of −23 dB at a 10 MHz offset. If the FBAR notch were placed at 16 instead of 27 MHz offset, it would have improved image rejection by a further −10 dB; this can be easily be achieved by FBAR tuning. The frequency-hopping voting scheme enables extremely large blockers to be located near any single channel Testing to the limit of the employed signal generator revealed that, with frequency-hopping voting, up to −60 dB SIR could be achieved for both BLE and 802.11g Wi-Fi jammers. The actual limit is likely to be higher, as would be expected to be shown with more capable test equipment. Testing showed that the prototype provided the best sensitivity and highest amount of interference rejection amongst the known prior BLE-compatible WuRXs discussed in the background section at comparable power consumption.

Figure 4A:
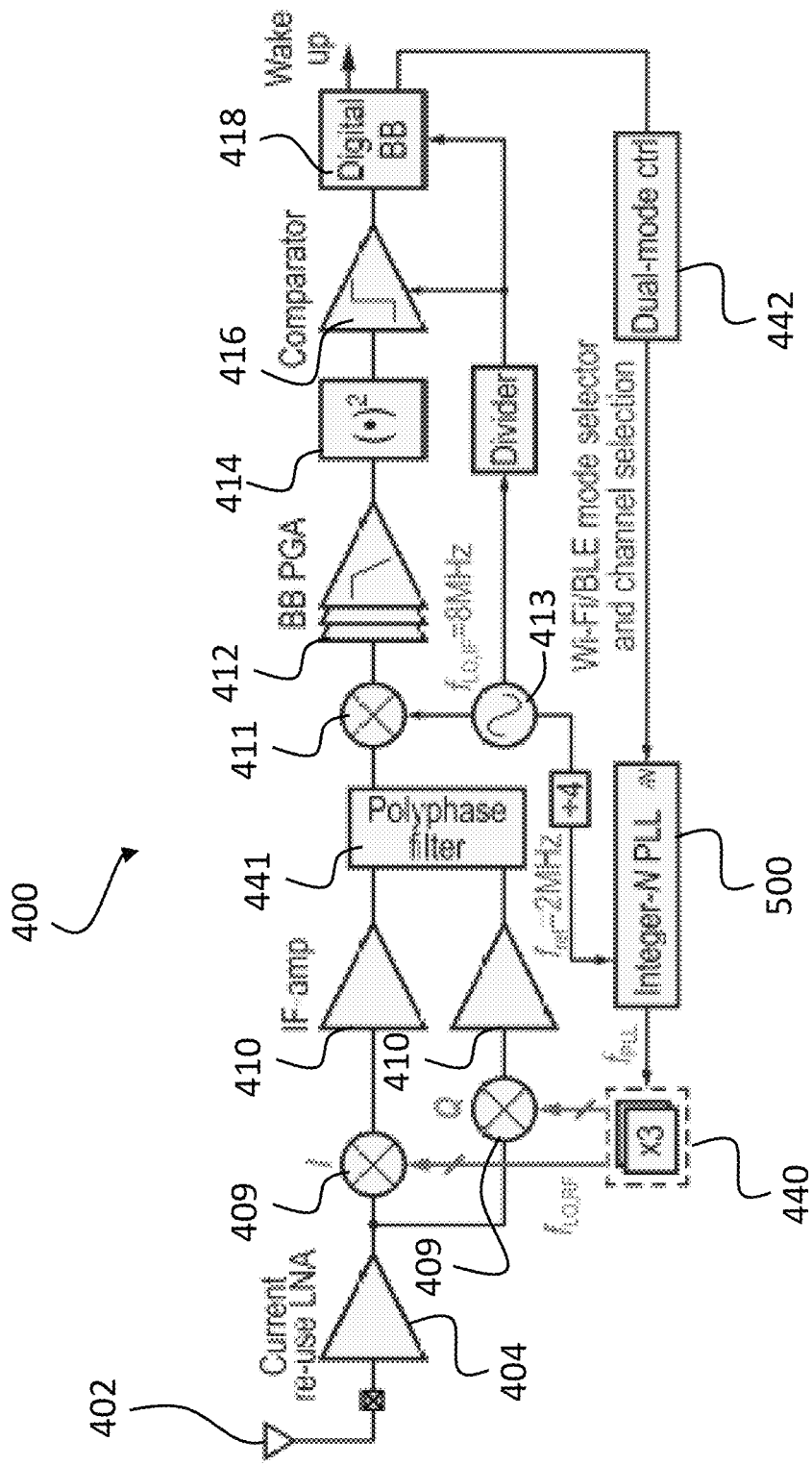
FIG. 4A shows a preferred circuit similar to FIG. 1A, and including dual mode operation for wake-up according to multiple bands, e.g., WiFi and BLE.
Figure 4B:
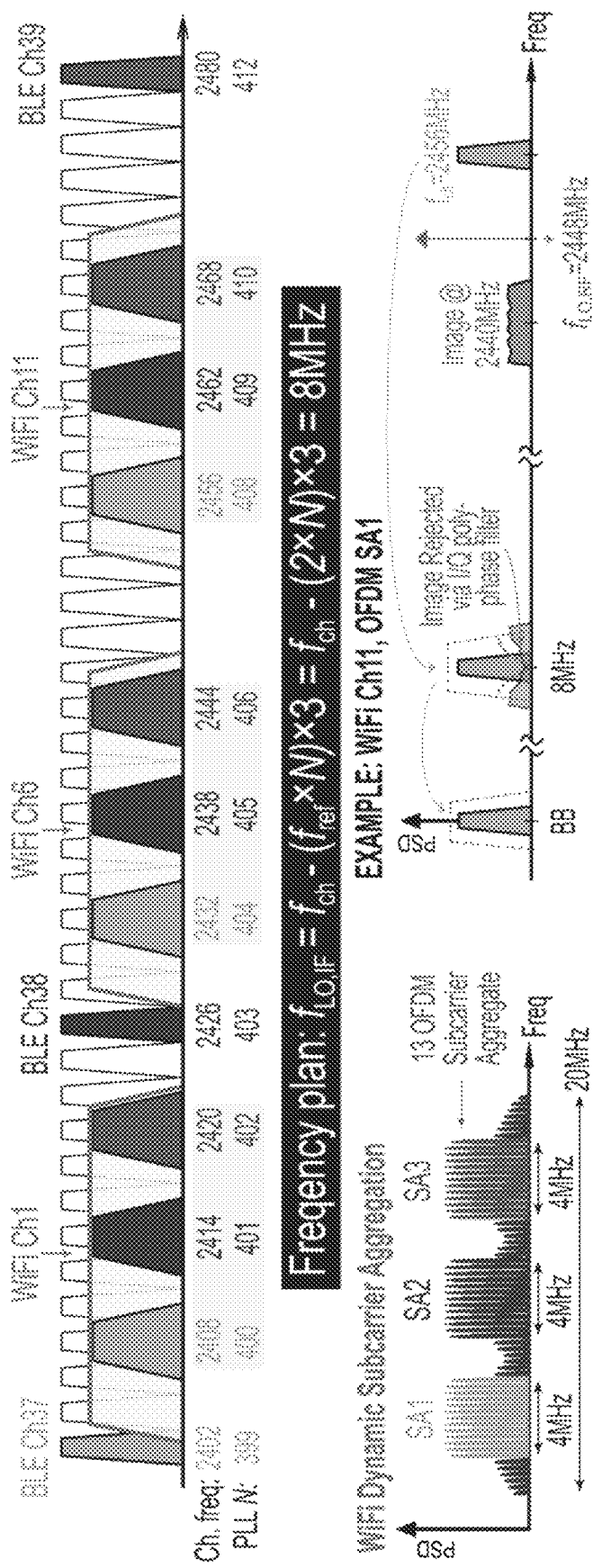
FIG. 4B FIG. 4B shows a preferred frequency plan for dual mode operation.

FIG. 4A shows a preferred WuRX 400 similar to FIG. 1A, and including dual mode operation for wake-up according to multiple bands, e.g., WiFi and BLE. Both of the FIG. 1A and FIG. 4A designs are preferably a unitary integration on a single chip (except for the off-chip FBAR filter 106), which helps provide ultra-low power operation. Reference numerals modeling those from FIG. 1A are used to indicate similar components, e.g. 102 and 402 both indicated antennas. The current re-use LNA 404 includes a matching network that corresponds to the matching network 104 in FIG. 1A. FIG. 4B shows a preferred frequency plan for dual mode operation. The frequency plan follows that of FIGS. 1B and 1C. However, in FIG. 4A an IQ (in phase and quadrature) LO 440 is generated (via ×3 edge combiner 520 in FIG. 5A), and the image is rejected fully on-chip via a passive IQ mixer 409 followed by a polyphase filter 441, which receives the intermediate frequency amplified signal from the IF LNA 410. Wi-Fi wake-up follows a similar frequency plan by creating an aggregate of 13 OFDM subcarriers (totaling 4 MHz) that, instead of turning on and off as in prior back-channel communication work, hop between three different aggregates of 13 subcarriers within a single 20 MHz Wi-Fi channel A dual mode control 442 is a digital logic circuit that changes tine PLL integer N mode to selected WiFi or BLE. The difference of Wi-Fi and BLE mode for the WuRX is the signal channel frequency. In the preferred design, to change the detected channel, only the PLL divider ratio N needs to change. The dual mode control 442 is a pure digital logic circuit to control the PLL N value. If mode sel is 0/1, MUX selects Wi-Fi/BLE mode, and the respective logic controls the N value. Since there are 3 possible groups of channel frequency for Wi-Fi, an additional control is added to select which group to use. By carefully selecting the center frequencies of the dynamic SAs, the same integer-N PLL can be used for three Wi-Fi channels (1, 6, and 11) simply by using different values of N as indicated in FIG. 4B. An on-chip digital baseband (DBB) signal processor 418 controls the mode of operation and performs frequency hopping by adjusting N. The on-chip DBB digital signal processor 418 also controls the wake-up signature logic, which uses a programmable window, WL, to gate the digital BB input to prevent blockers that may occur right in the middle of the packet interval from potentially initiating an erroneous state transition.

Figure 5A:
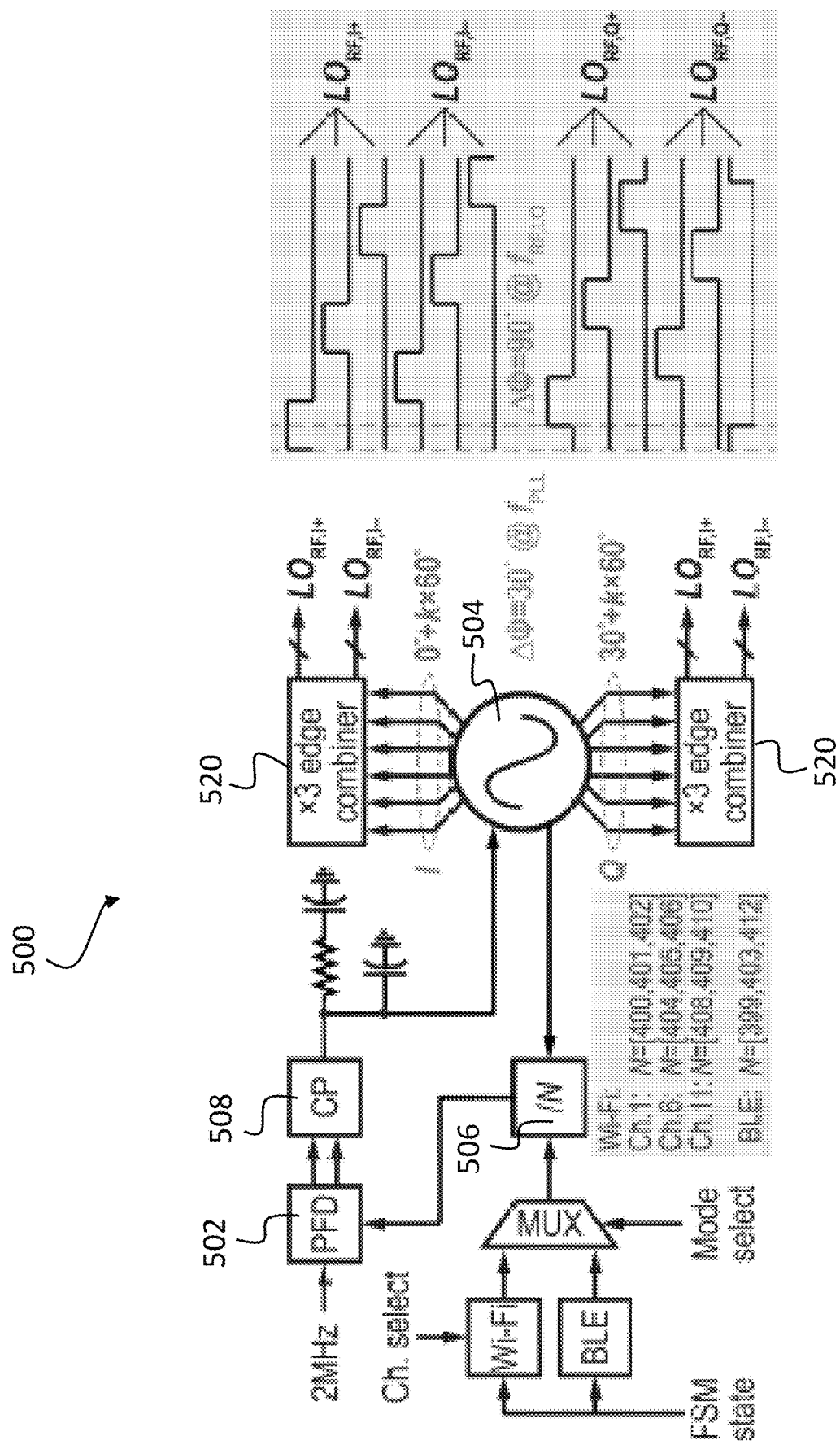
FIG. 5A shows a preferred embodiment integer phase locked loop (PLL) for the FIG. 4A WuRX.
Figure 5B:
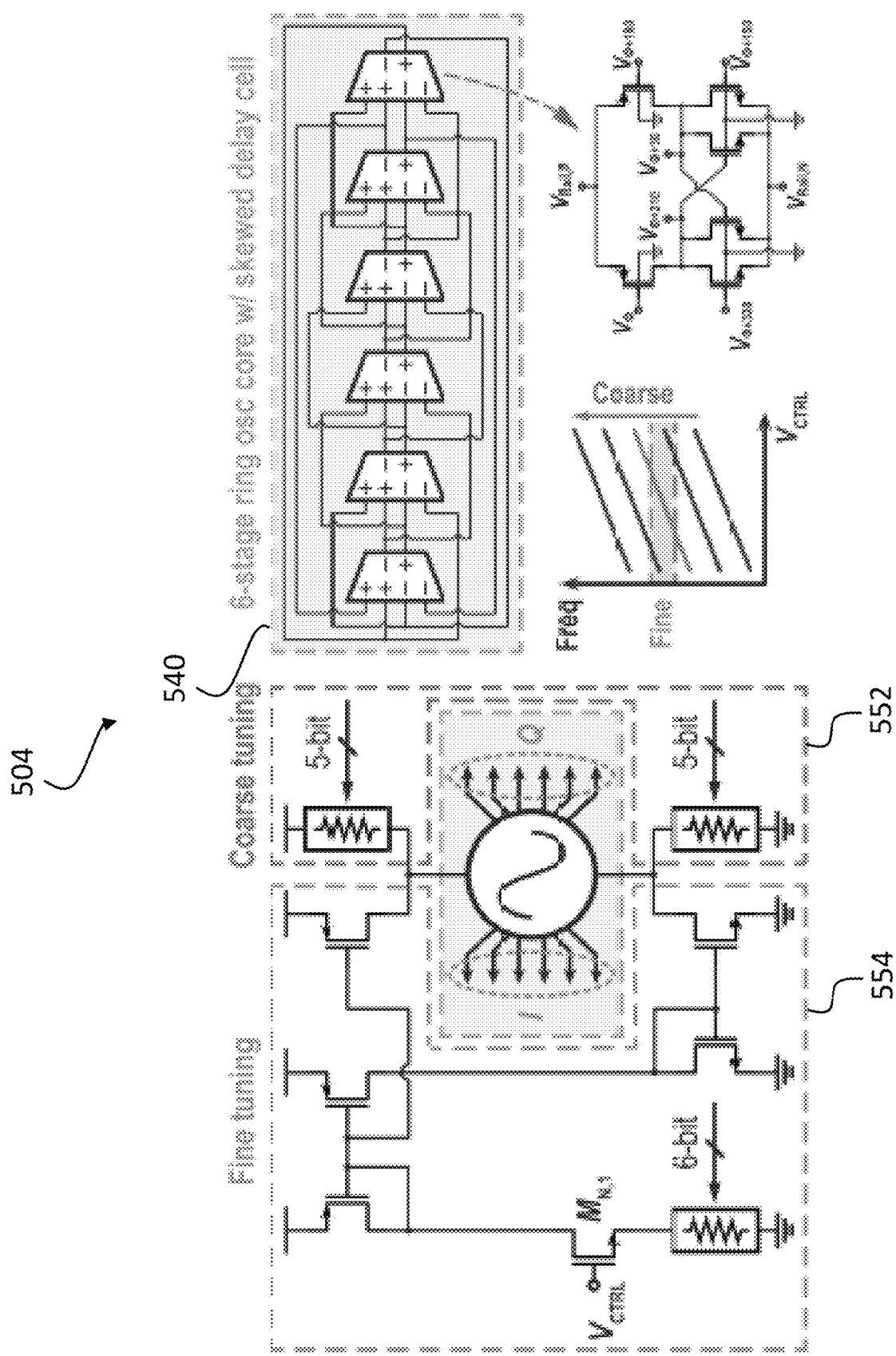
FIG. 5B illustrates coarse and a fine tuning paths of the PLL of FIG. 5A.

To save power, a preferred PLL 500 for the circuit of FIG. 4A is shown in FIG. 5A. Similar features are labelled consistently with the PLL in FIG. 2A, e.g., the PFD in FIG. 2A is 202 and the PFD in FIG. 5A is 502. The PLL 500 uses an ~800 MHz ring VCO 504, and generates the 2.4 GHz-band LOs via an AND-based frequency-tripling edge combiner 520. To generate the IQ signals needed for image rejection, 2 sets of 6-phase clocks 30. apart are required, which, after the frequency tripler, result in the desired 90° phase shift. Instead of designing a 12-stage ring oscillator, which would be challenging to operate at 800 MHz at 0.5V (for low power) in 65 nm, a differential 6-stage ring oscillator shown in FIG. 5B with skewed delay cells 540 is used, and the PMOS bodies are grounded to improve conductance, thereby reducing transistor size and thus $CV^2$ power. As shown in FIG. 5B, To ensure PLL stability, both a coarse 552 and a fine tuning path 554 are used to control the $K_{VCO}$ while still maintain a large frequency tuning range to overcome PVT.

Figure 6A:
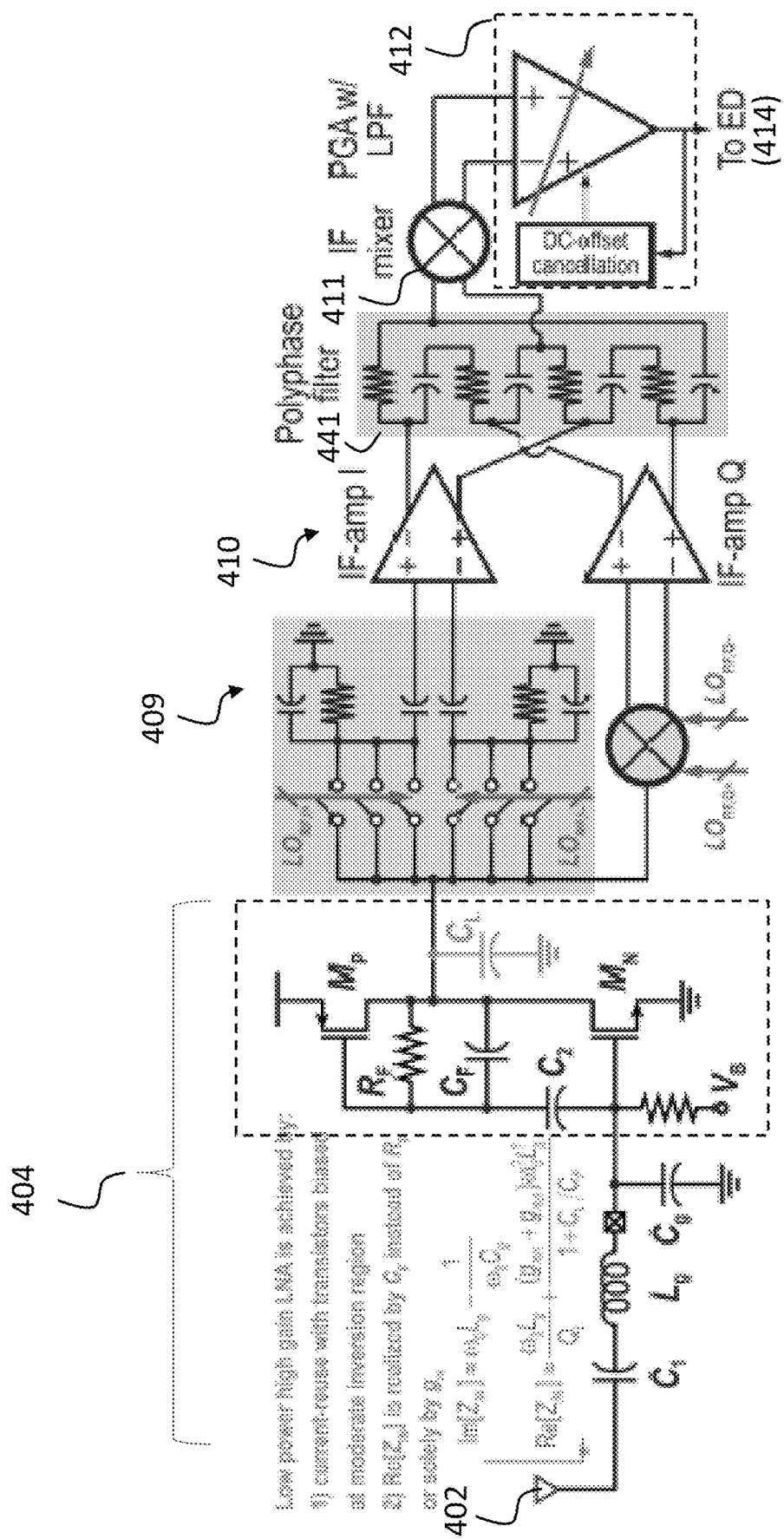
FIG. 6A shows 6A shows a preferred schematic of the RF signal chain of FIG. 4A.

FIG. 6A shows a preferred schematic of the RF signal chain of FIG. 4A. The employed LNA 410, comprising transistors MN and MP and associated passives, achieves a gain of 18 dB at low power by using feedback capacitor CF to realize the input match, all while using a current-reuse architecture and moderate inversion biasing. The output of the LNA drives the IQ mixer. As part of the tripler, each IQ RF LO drives a 2-phase 6-switch passive mixer and down-converts the incident RF signal to IF. The IQ IF signals are then amplified by IQ IF amplifiers, fed to a polyphase filter, and then summed to achieve image rejection.

Figure 6B:
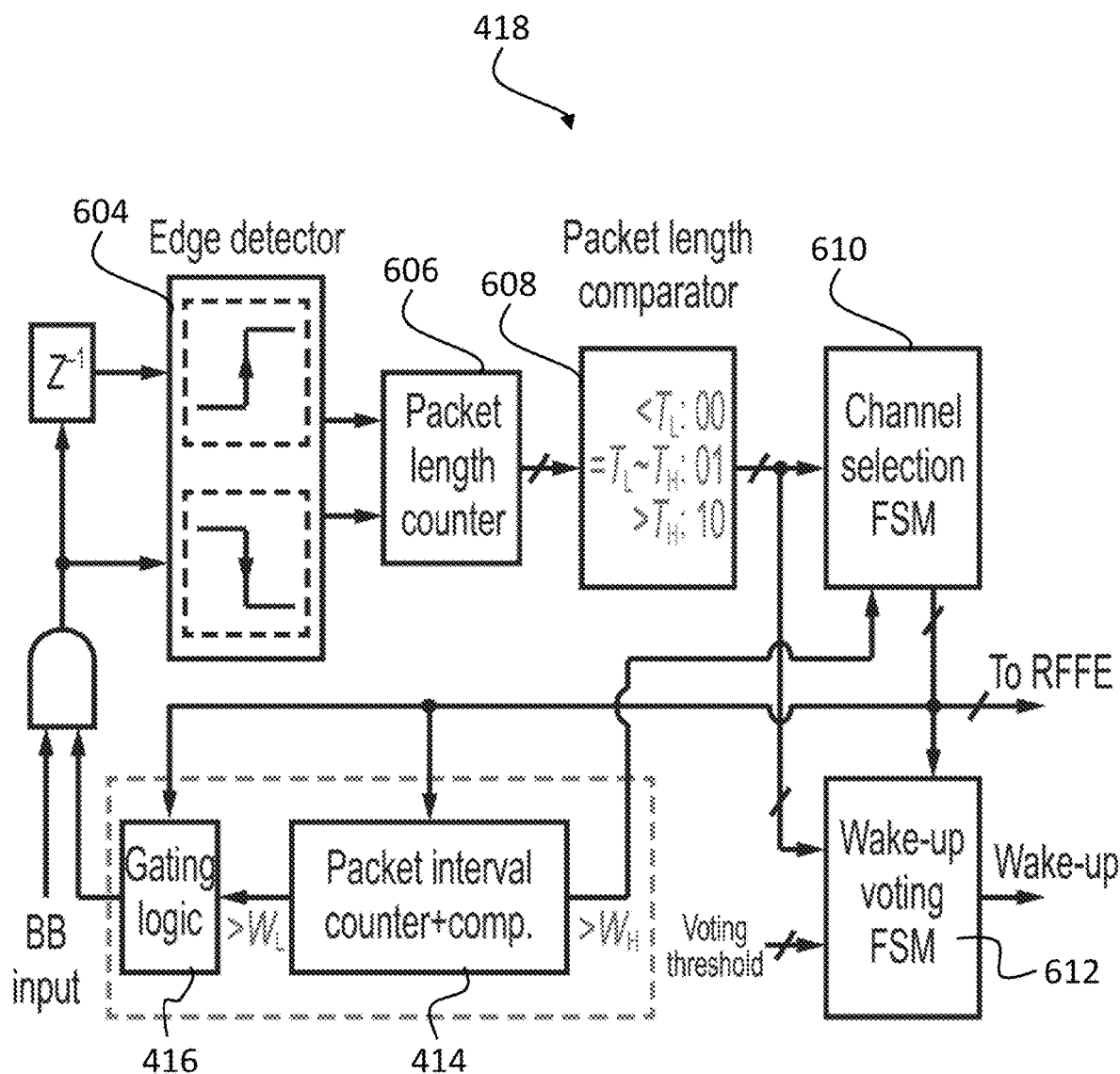
FIG. 6B shows block diagram of the on-chip DBB DSP 418 of FIG. 4A.
Figure 6C:
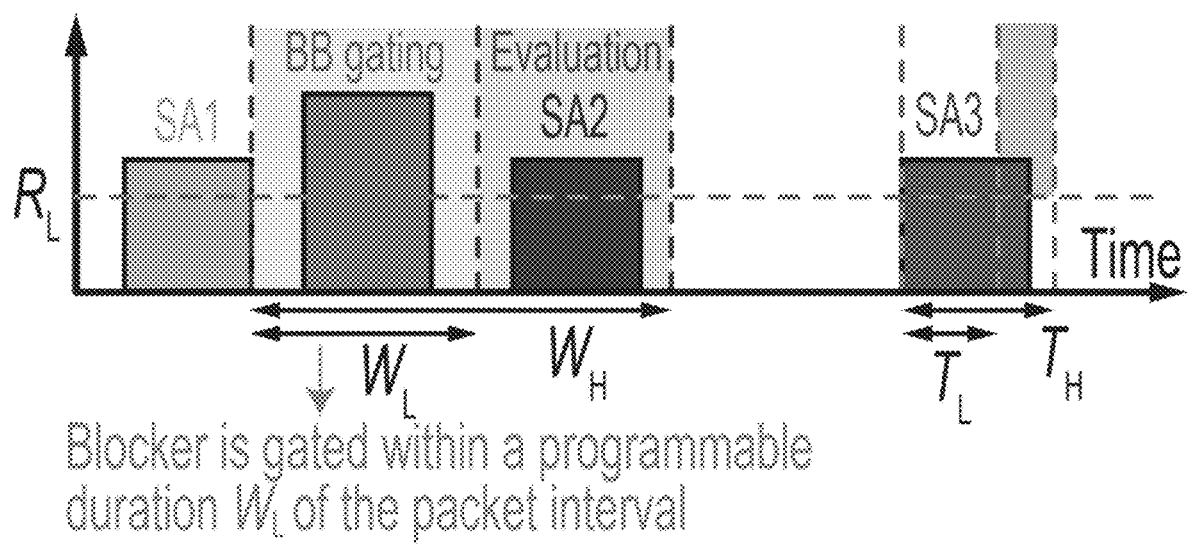
FIG. 6C shows an example packet sequence processed by the packet interval computation logic of FIG. 6B.

FIG. 6B shows the block diagram of the on-chip DBB DSP 418 of FIG. 4A, where an edge detector 604 first compares the input signal with a delayed version to extract the rising and falling edge timing of the packet (BLE) or SA (Wi-Fi), which are used to compute the packet/SA length 606. The measured packet/SA length is then compared 608 to a pre-defined window, TL~TH, to generate a 2-bit control for the channel selection finite state machine (FSM) 610 and the wake-up voting FSM 612. The 2-bit state output of the channel selection FSM controls the RF front-end to the desired channel, while providing the current sequencing order for the a packet interval counter and comparator 614 and gating logic 616. The packet interval computation logic, which consists of 614 and 616 in FIG. 6B, is enabled after a first packet (SA1 in FIG. 6C) is received and causes a FSM state change. Right after the state change, the input is gated until the packet interval is larger than a lower bound duration WL, while the FSMs rotate back to the initial stage if the packet interval is larger than an upper bound duration WH and still no new packet is received. Therefore, the packet interval computation logic enhances the time interval between packet dimension, provide more correlation with the wake-up signature, and prevents the FSMs from being locked in a specific state.

Preferred embodiments of the invention achieve ultra-low power and high sensitivity while supporting multi-channel frequency diversity and interference resiliency by: 1) integrating the energy in each advertising channel via a 4D wake-up signature incorporating frequency-hopping majority voting algorithm for low-cost energy-detection-based demodulation; 2) a careful frequency planning that enables a mixer-based two-stage heterodyne receiver that achieves low power while provides multi-stage channel filtering; and 3) implementing a 3-channel LO generator via an ultra-low-power crystal-stabilized ring-oscillator-based integer-N PLL with frequency tripler that achieves sufficient phase noise. A prototype of FIG. 1A consumes 220 uW, while a prototype of FIG. 4A consumes 352 uW. For a wake-up latency of 1 s, the FIG. 4A design power can be scaled down to 4.4 uW. The FIG. 1A example is BLE-compliant only (but could be WiFi) only, and requires a direct filter for image rejection, such as the FBAR filter. However, the power consumption is lower because there is no need to generate I/Q RF clock for image rejection as in the FIG. 4A design that can operate on the two frequency bands. The FIG. 4A design is believe by the inventors to be the first ever BLE/Wi-Fi dual mode WuRX. It does not require an off-chip FBAR filter since there is on-chip image rejection circuit. The FIG. 4A design has better performance on all specs except the power consumption is a little higher than FIG. 1A. FIG. 1A provides new wake-up signature and a new approach to a channelized BLE-compliant WuRX, which preferably leverages FBAR-based filtering and an elegant frequency plan to support ultra low-power.

The FIG. 4A design provides the first ever BLE/Wi-Fi dual-mode wake-up receiver while also achieves the best sensitivity of any BLE WuRX (−92 dBm), very competitive sensitivity in WiFi mode (−90.3 dBm), can scale power down to 4.4 uW while keeping wake-up latency <1 s, achieves the best reported signal-to-interferer ratio of any WuRX (−67 dB), introduces a new way to enable frequency-diversity in WiFi WuRXs via dynamic subcarrier aggregation frequency hopping, and eliminates the off-chip FBAR filter of FIG. 1A via an on-chip image reject filter, for a smaller overall implementation compared to FIG. 1A.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A low-power wake-up receiver to process energy in a plurality of advertising channels, comprising:
    circuitry for channel filtering and adjacent channel rejection;
    circuitry for mixing at least one wake-up frequency band to at least one intermediate frequency band;
    power threshold circuitry for checking for power amplitude of an advertisement packet;
    packet length comparison circuitry for determining a packet length of an advertisement packet;
    channel selection circuitry for selecting at least two advertising channels; and a digital signal processor that comprises a baseband digital signal processor that checks advertisement packets meeting a power amplitude and a packet length of a wake-up signature, checks packet length and time interval between such packets, and generates a wake-up signal that is defined by a four-dimensional wake-up signature formed from a combination of packet length, a time interval between packets, a sequence of selected channels and power amplitude of the received packets.

2. The receiver according to claim 1, comprising an off-chip direct filter for image rejection.

3. The receiver according to claim 2, wherein the on-chip filter comprises a Film Bulk Acoustic Resonator (FBAR) filter.

4. The receiver according to claim 2, wherein the on-chip filter comprises a SAW or BAW filter.

5. The receiver according to claim 1, wherein the baseband digital signal processor first checks for power amplitude and time interval on a first advertisement channel, and if consistent with the wake-up signature, then switches to a second channel.

6. The receiver according to claim 1, wherein the at least one wake-up frequency bands comprises the Bluetooth Low Energy frequency band.

7. The receiver according to claim 1, wherein the at least one wake-up frequency bands comprises a WiFi band.

8. The receiver according to claim 1, wherein the at least one wake-up frequency bands comprises a plurality of frequency bands.

9. The receiver according to claim 8, wherein the plurality of frequency bands consists of the Bluetooth Low Energy frequency band and the WiFi band, the receiver further comprising in phase and quadrature clocking circuitry for image rejection integrated in a single, unitary chip with all other receiver circuitry.

10. The receiver according to claim 1, wherein the power threshold circuitry, packet length comparison circuitry and the base band digital signal processor implement a frequency-hopping time-counting majority-voting wake up signature detection over four distinct dimensions of the wake-up signature.

11. The receiver according to claim 1, comprising an on-chip integer phase locked loop.

12. The receiver according to claim 1, integrated in a single, unitary chip with a power requirement of 352 uW or less.

13. The receiver of claim 1, wherein the at least two advertising channels comprise a plurality of advertising channels and the digital signal processor conducts frequency-hopping among the plurality of advertising channels while checking the advertisement packets.

14. The receiver of claim 13, wherein the plurality of advertising channels comprises three advertising channels and the digital signal processor implements majority voting among the three advertising channels to produce the wake-up signal when two of the channels include the four-dimensional wake-up signature.

15. The receiver of claim 14, wherein the advertising channels are Bluetooth Low Energy advertising channels.

16. The receiver of claim 14, comprising dual mode circuitry for switching between frequencies for Bluetooth Low Energy advertising channels and WiFi advertising channels.

* * * * *